July 22, 1969  T. E. HEMPHILL ET AL  3,456,959
PUSHCART
Filed Nov. 22, 1967  2 Sheets-Sheet 1
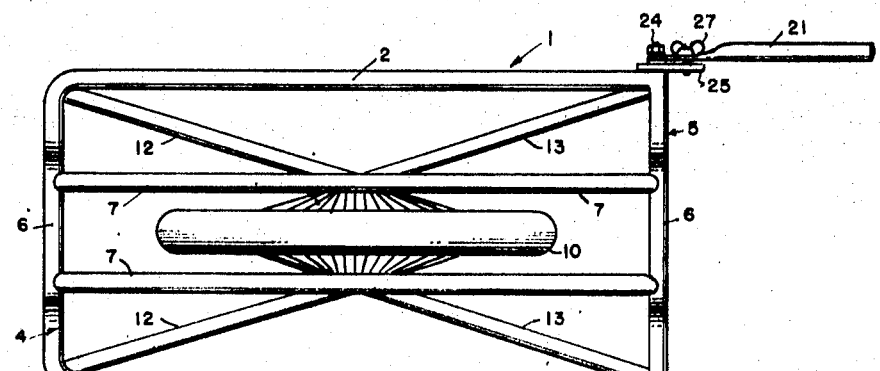
Fig. 1
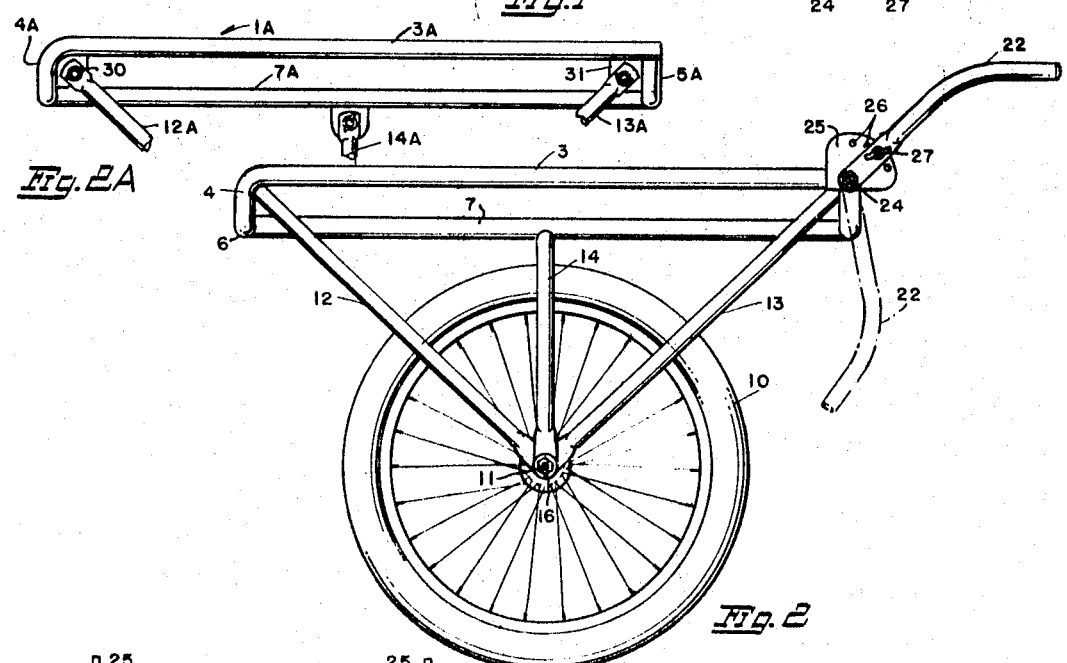
Fig. 2A
Fig. 2
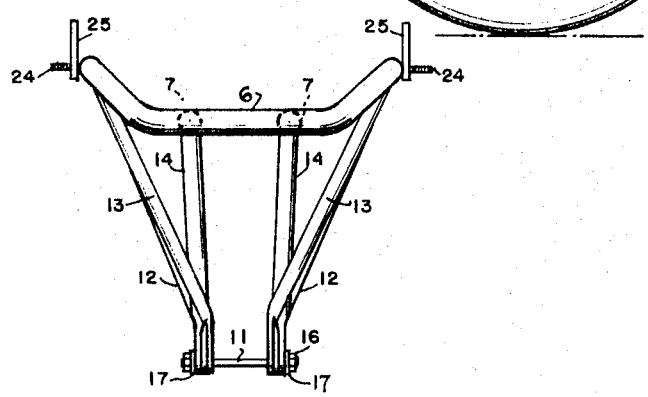
Fig. 3
THOMAS E. HEMPHILL
BILLY J. HENDERSON
*INVENTORS*
BY James D. Givnan
ATT'Y July 22, 1969　　T. E. HEMPHILL ET AL　　3,456,959
PUSHCART Filed Nov. 22, 1967　　2 Sheets-Sheet 2

THOMAS E. HEMPHILL
BILLY J. HENDERSON
　　INVENTORS

BY James D. Girnan
　　　ATT'Y

# United States Patent Office 3,456,959
Patented July 22, 1969

3,456,959
PUSHCART
Thomas E. Hemphill, 2414 84th St. NE., Vancouver, Wash. 98662, and Billy J. Henderson, 8717 SE. Sunnyside Road, Clackamas, Oreg. 97015
Filed Nov. 22, 1967, Ser. No. 685,048
Int. Cl. B62b 1/00, 7/02
U.S. Cl. 280—47.3    2 Claims

ABSTRACT OF THE DISCLOSURE

A cart for transporting the bodies of carcasses of wild game animals, and the like, along trails and through wooded sections of hunting areas. The cart comprises a main body made of hollow like weight metal tubing mounted upon a single centrally disposed ground engaging wheel and thereby readily maneuverable with any load arranged in symmetry relative to the single wheel.

---

This invention relates to improvements in a cart as above described whose principal objects are:

To provide a main body for the cart made of light weight hollow steel tubing capable of inexpensive construction by simple bending jigs and simple welding operations.

To provide an undercarriage comprising tubular struts either permanently or removably secured to the cart body and converging into supporting engagement with the axle of the centrally disposed, unitary, ground engaging wheel.

To provide handles at either or both ends of the cart body which are collapsible from an operable position into a retracted, space-conserving, inoperative position.

To provide a braking mechanism including a hand lever readily adaptable to one of the handles and operatively connected by flexible cable brake levers of the caliper type provided with wheel-engaging brake shoes.

The foregoing and other objects and advantages which will become subsequently apparent reside in the details of construction and operation as as more fully hereinafter described and claimed, reference being had to the accompanying drawings forming a part hereof and in which:

FIGURE 1 is a top plan view of a cart made in accordance with our invention.

FIGURE 2 is a side elevational view of FIGURE 1.

FIGURE 2A is a fragmentary side elevational view of a modified form of the main body of the cart.

FIGURE 3 is an end elevational view of FIGURE 2 with parts removed for convenience of illustration.

Figure 4:
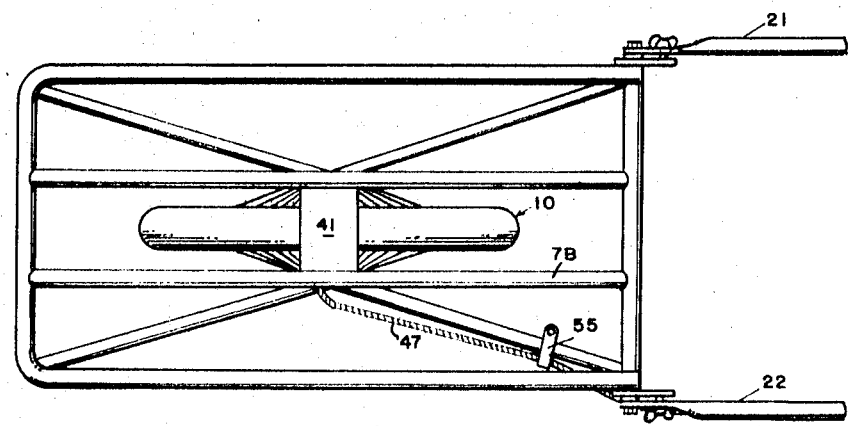
FIGURES 4, 5 and 6 are views similar to 1, 2 and 3 illustrating the addition of a wheel brake and actuating mechanism therefor.

Referring now more particularly to the drawings wherein like reference numerals designate like parts, numeral 1 indicates generally the main body of the cart which is preferably, though not restrictively, of rectangular shape in top plan view, and comprises an outside frame made of a single length of tubing formed into longitudinal side frame members 2 and 3 and a forward transverse member 4. The opposite or rearward ends of members 2 and 3 are permanently secured in any suitable manner, such as by welding or the like, to a transverse tubular member 5 identical in elevation with the front transverse member 4.

As best illustrated in FIGURE 3, the center section 6 or both transverse members 4–5 are bent downwardly to a lower plane than that of the main side members 2 and 3. These transverse end members are rigidly interconnected by longitudinal tubular frame members 7 welded at both of their ends to said center sections 6 of the end members.

The main body of the cart is supported by a single centrally disposed ground engaging wheel 10, freely rotatable about an axle 11 extending through the overlapping bottom ends of two pairs of diagonal struts 12 and 13 and the corresponding ends of a pair of centrally disposed similar struts 14. The top end of struts 12–13 are welded to the corners of their respective ends of the main body frame 1 and the top end of struts 14 are welded to the center inner parallel frame members 7.

The bottom ends of all the struts are secured to the ends of axle 11 in the conventional manner by nuts 16 and washers 17.

For convenience in maneuvering the cart we provide a pair of identical handles 21–22 curved upwardly and rearwardly from the end of the cart body as shown in FIGURE 2. Each handle is swingably and lockably attached to its respective side frame member by a bolt 24 threaded into a quadrant 25 welded to the rearward end of the frame member and provided with an arcuate row of threaded apertures 26 with which a wing bolt 27 may be selectively engaged for locking the handles in any desired operative position as shown in full lines in FIGURE 2 or dropped downwardly into the space-conserving inoperative position shown in broken lines.

It will be readily understood that all of the body members as well as the struts may be of steel tubing of the same outside diameter or with the tubular members of the body being of one diameter and those of the struts a lesser diameter.

In the modified form of cart body shown in FIGURE 2A, the top end of struts 12A–13A instead of being welded as in FIGURES 1–3 are removably secured to the main frame by wing bolts 30 threaded into gusset plates 31 welded to the underside of the frame corners, and the top end of struts 14A are similarly secured by gusset plates to the inner tubular frame members 7A.

The bottom end of the three struts on each side of the cart can be permanently interconnected by welding or the like to thus enable the main body, strut assemblies and the wheel to be disassembled for compact storage or transportation.

Figure 5:
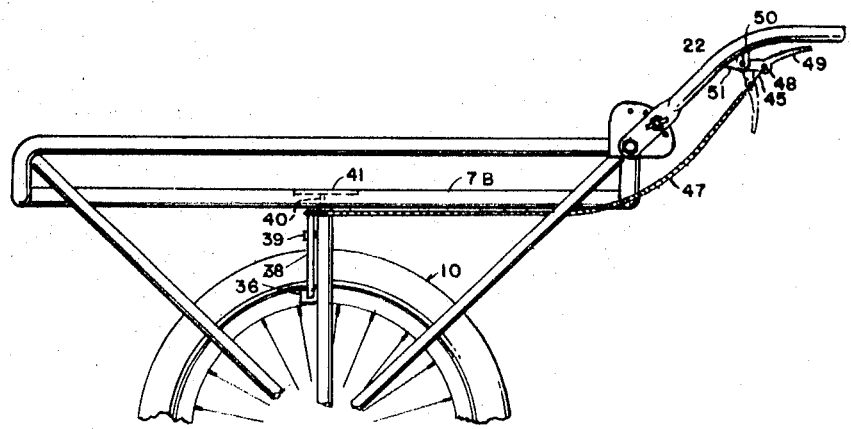
Figure 6:
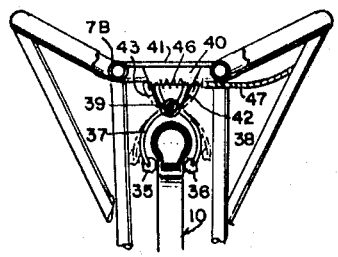

The wheel brake mechanisms shown in FIGURES 4, 5 and 6 comprises two coacting brake shoes 35–36 attached respectively to the bottom end of two levers 37 and 38 crossed and thereat pivotally interconnected by a pivot pin 39 carried by a vertical plate 40 welded to and depending from a platform 41 welded across both of its ends to and flush with the two parallel inner frame members 7B. The caliper characteristics of levers 37–38 establishes two lever arms 42–43 above the pivot point 39 while the levers 37–38 function as load arms below the pivot point.

The load arms 37–38 are operable toward each other for applying the brake shoes to the rim of the wheel 10 by a control wire 45, and normally held apart to enable freewheeling, by an interposed compression spring 46. Wire 45 extends from the lever arms 42–43 through a flexible conduit 47 to a connection 48 with a brake lever 49 swingably attached as at 50 to a bracket 51 secured to the underside of the cart handle 22. Conduit 47 is attached as at 55 to the body or strut components at convenient points within its reach from the brake lever 49 to its terminal end adjacent the lever 42.

What we claim is:
1. A cart comprising a body supported by a single ground-engaging wheel having an axle, a rim and a tire, said body consisting of a rigid main frame having integral longitudinal side members and a transverse forward end member,
a rear transverse end member permanently secured to said side members, an inner frame comprising parallel members coextensive in length with said main frame and permanently secured to said transverse end members of the main frame,
said body supported by struts permanently secured at their top ends to the four corners of said main frame,
all of said struts converging to attachment at their bottoms ends to said wheel axle,
a quadrant permanently secured on each opposite side of one end of said main frame and having an arcuate row of threaded apertures therethrough,
a handle swingably and lockably attached to each of said quadrants,
a bolt carried by each of said handles and selectively engageable with said apertures in its respective quadrant.

2. A cart as claimed in claim 1 including a vertically disposed plate carried by said inner frame,
a brake comprising a pair of levers pivotally suspended from said vertically disposed plate and extending downwardly and inwardly relative to said tire for inward movement into braking engagement with said wheel rim,
said arms extending above their said pivotal connection and operable by a common control wire extending rearwardly of said cart body and terminating in a brake lever swingably attached to one of said handles.

References Cited
UNITED STATES PATENTS

| | | | |
|---|---|---|---|
| 2,416,492 | 2/1947 | Neeley | 280—47.3 |
| 2,715,030 | 8/1955 | Peterson | 280—47.3 |
| 2,803,469 | 8/1957 | Pfisterer | 280—47.3 |
| 2,918,296 | 12/1959 | Goodale | 280—47.3 |
| 2,992,834 | 7/1961 | Tidwell et al. | 280—47.3 |
| 3,236,537 | 2/1966 | Eckman | 280—47.3 |

LEO FRAGLIA, Primary Examiner

J. A. PEKAR, Assistant Examiner